United States Patent [19]

Asai et al.

[11] Patent Number: 5,591,093
[45] Date of Patent: Jan. 7, 1997

[54] DAMPER PULLEY

[75] Inventors: Tomohito Asai, Gifu; Toru Isono, Kagamigahara; Kazutoshi Miyake, Ichinomiya, all of Japan

[73] Assignee: Toyoda Gosei Co., Ltd., Japan

[21] Appl. No.: 386,724

[22] Filed: Feb. 10, 1995

[30]  Foreign Application Priority Data

Mar. 18, 1994 [JP] Japan .................................. 6-074432

[51] Int. Cl.⁶ ..................................................... F16D 3/00
[52] U.S. Cl. ............................................ 474/94; 474/902
[58] Field of Search ..................... 474/94, 166, 174–178, 474/902, 903; 74/574

[56]  References Cited

U.S. PATENT DOCUMENTS

| D. 347,378 | 5/1994 | Warner .................... D8/360 |
| 4,543,924 | 10/1985 | Bostock et al. ............. 474/161 X |
| 4,710,152 | 12/1987 | Ichikawa et al. ............ 474/166 |
| 4,794,816 | 1/1989 | Serizawa et al. ............ 474/166 X |
| 4,815,332 | 3/1989 | Serizawa et al. ............ 74/574 X |
| 4,881,426 | 11/1989 | Serizawa et al. ............ 74/574 |
| 5,140,868 | 8/1992 | Mizuno et al. ............. 74/574 |
| 5,308,289 | 5/1994 | Funahashi ................. 474/903 X |
| 5,441,456 | 8/1993 | Watanabe et al. ........... 474/902 X |
| 5,465,485 | 11/1995 | Miyake et al. ............. 474/902 X |
| 5,527,227 | 6/1996 | Asai et al. ................ 474/166 |

FOREIGN PATENT DOCUMENTS 272835  11/1988  Japan .............................. F16F 15/12

*Primary Examiner*—Roger J. Schoeppel
*Attorney, Agent, or Firm*—Cushman Darby & Cushman IP Group of Pillsbury Madison & Sutro, LLP

[57]  ABSTRACT

A lightweight damper pulley is provided which can be produced in a simple manner. The damper pulley includes a central portion, including a cylindrical boss portion to be fixed onto a rotary shaft, a main portion extending radially outwardly from the larger diameter part of the cylindrical boss portion and a central flange bent to extend horizontally from an outer periphery of the main portion. This forms a substantially U-shaped cross-sectional profile. The pulley also includes a belt retaining portion made of metal plate that also has a substantially U-shaped cross section profile. This space is determined between an outer belt supporting wall, an inner belt portion flange and a radially extending connecting wall. The pulley is constructed by reversing the two U-shaped profiles or dissecting the belt retaining flange to the interior of the central flange, with an elastic, damping ring forcefit therebetween. The belt retaining flange can also be moved radially outwardly to compress the elastic.

3 Claims, 3 Drawing Sheets

DAMPER PULLEY

BACKGROUND OF THE INVENTION

1. Field of the Invention

The present invention relates to a dynamically damped pulley and, more particularly, to a damper pulley which is lightweight and can be produced in a simple manner.

2. Background and Description of Related Art

Conventional damped pulleys have been constructed from cast metal, central portion, a cured rubber section on the periphery of the damper pulley and a cast ring surrounding the pulley and the rubber section. Such a pulley has significant weight because the central portion and the belt retaining portion are formed of thick cast metal. Also, the cost of curing the rubber or elastic member is expensive and can also require use of adhesives.

FIG. 7 illustrates another conventional damper pulley. The damper pulley comprises a central portion, a belt retaining portion and a rubber or elastic member therebetween. In order to reduce both the weight and production costs, the central portion and the belt retaining portion are formed from thin metal plate material. The central portion includes an axially extending tubular boss portion 10, a main portion 20, extending radially outwardly therefrom, and a flange 210 that is bent at about 90° from main portion 20 so as to extend axially from the outer periphery of the main portion 20. The boss portion 10, main portion 20 and flange 210 define a circular space S1 having a substantially U-shaped cross-section. A ring-shaped belt retaining portion 30, which has a generally U-shaped cross-section interior open space S2 reverse to the space S1, is also formed from thin metal plate. The belt retaining portion 30 is positioned over the outside of the flange 210, and an annular rubber or elastic member 40 is disposed between the flange 210 and the belt retaining portion 30.

Japanese Utility Model application laid-open No. Hei 272835 discloses a damper pulley which combines the above mentioned construction with a second rubber vibration isolator member and a mass-member. Accordingly, the damper pulley comprises a damper pulley portion, a belt retaining portion, a first elastic member disposed between the damper pulley portion and the belt retaining portion, a mass member, and a second elastic member positioned between the inner wall of the belt retaining portion and the mass member.

However, the damper pulley in FIG. 7 is still not satisfactory. The back interior side of the outer wall 310 of the belt retaining portion 30 needs to be supported by a die when grooves 312 are formed by spin forming the surface of the outer wall 310. However, as the outer diameter of the damper pulley is fully formed, the open space S2 may not be satisfactory for inserting the positioning die in case of forming grooves in the outer wall of the belt retaining portion. When the space S2 becomes larger to permit the easy insertion of a support die, the diameter of the rubber or elastic member 40 becomes small so that the torsional spring force deteriorates, and the resonant frequency of the damper pulley depreciates. To overcome the above problems, the hardness of the rubber elastic member needs to be raised, but without lessening the durability thereof. Besides, the elastic member 40, which is disposed between the flange 210 and the belt retaining portion 30, is forced there between to prevent it from falling out. However, this is done by enlarging the diameter of the flange 210 which can result in the remote possibility that cracks might appear on the surface of the main portion 20.

SUMMARY OF THE INVENTION

It is an object of the prevent invention to provide a lightweight damper pulley made of thin metal plate and a damper pulley that is easily and quickly manufactured.

A damper pulley in accordance with the present invention comprises a central portion, a belt retaining portion and a rubber or elastic member. The central portion includes a cylindrical boss portion adapted to fit onto a rotary shaft, an enlarged main portion that extends a longer radial distance outwardly from the cylindrical boss portion, and a central portion flange extends backwards axially from the outer periphery of the main portion. The other element of the structure is an annular ring-shaped belt retaining portion, having a U-shaped cross-section, including an inner ring portion flange and an outer belt retaining wall. The annular ring-shaped retaining belt is disposed on an inner wall of the central portion flange and via the interior of that U-shaped cross-section. A ring-shaped elastic member is forced into the space between the inner wall of the belt retaining portion flange and the inner wall of the central portion flange.

The damper pulley portion is preferably integrally formed of a thin metal plate.

The damper pulley is manufactured by placing the elastic member on the inner surface of the flange followed by placing the inner wall of the belt retaining portion adjacent the elastic member, after which the diameter of the inner wall of the belt retaining portion flange is radially enlarged.

Other objects, features, and characteristics of the present invention, as well as the method of operation and functions of the related elements of the structure, and the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS

FIGS. 1 to 6 illustrate an embodiment of the present invention, which will be described in detail hereinafter.

Figure 1:
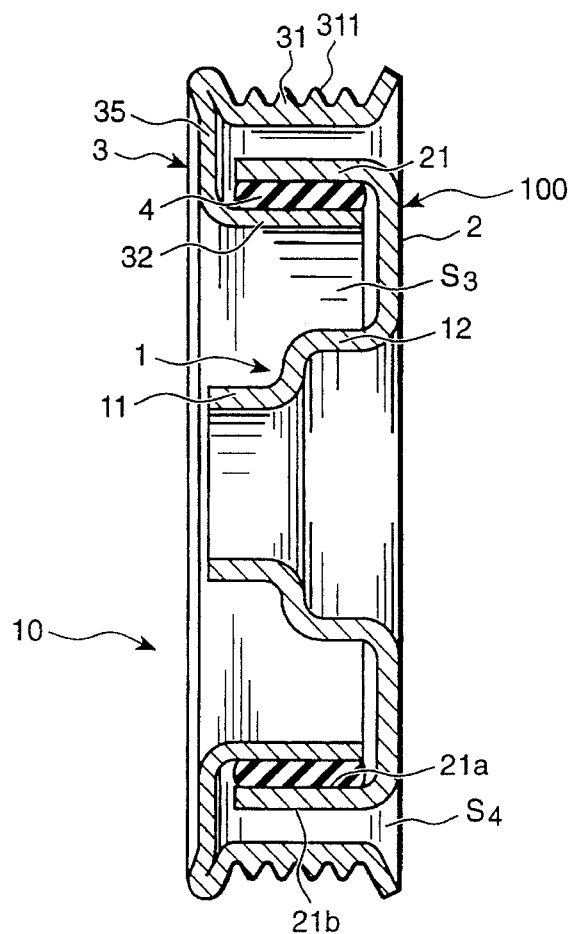
FIG. 1 is a cross-sectional view of a damper pulley of an embodiment in accordance with the present invention.

As shown in FIG. 1, a damper pulley 10 comprises a central portion 100, a ring-shaped belt retaining portion 3 and a rubber or elastic member 4. The central portion 100 includes an axially extending cylindrical boss portion 1, a radially extending main portion 2, and a flange portion 21. The central portion 100 is integrally formed from a thin metal plate by press-forming and defines an annular space S3 having an U-shaped cross-section in profile.

The boss portion 1 includes both a smaller diameter area 11 and a lager diameter area 12 with the exact configuration and dimensions being designed for a desired shaft mounting. The smaller diameter 11 is sized to fit onto a rotary shaft (not shown).

Figure 2:
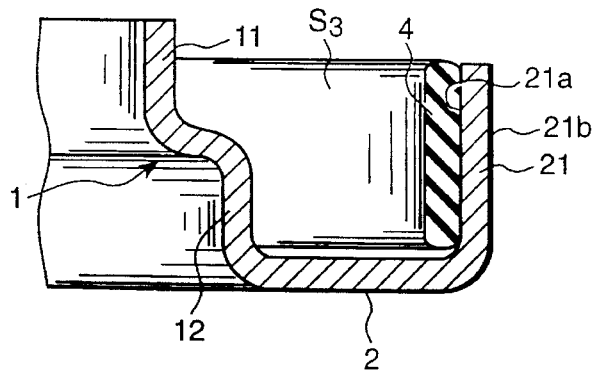
FIG. 2 is an enlarged partial cross-sectional view of the present invention.

The main portion 2 extends radially outwardly from the end of the lager diameter area 12. The flange 21, of a predetermined uniform length, extends axially backwards from an outer periphery of the main portion 2 to provide inner and outer torsional surfaces 21a and 21b, respectively, as shown in FIGS. 1 and 2.

Figure 3A:
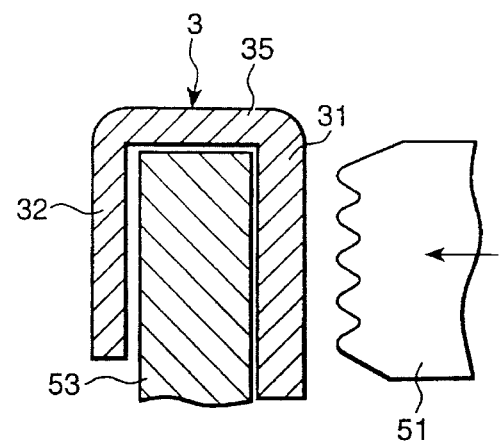
FIG. 3a and 3b are enlarged partial cross sectional view of the belt retaining portion in the manufacturing process in accordance with the present invention.
Figure 3B:
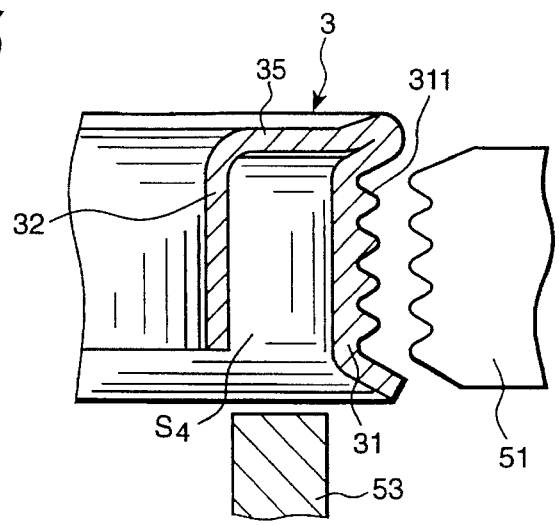
Figure 4:
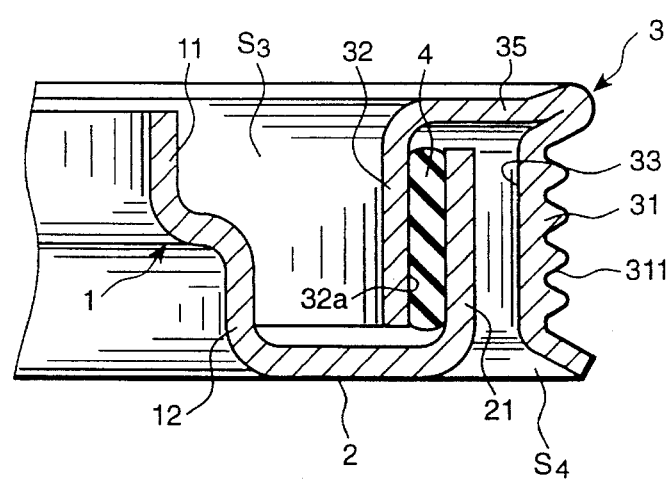
FIG. 4 is an enlarged partial cross-sectional view of a later step in the manufacturing process.

The ring-shaped belt retaining portion 3 has a grooved outer belt retaining wall 31, a radially extending portion 35 and a flange portion 32. These cooperate to define an open space S4 that has an U-shaped cross-section and is positioned in a manner reverse to open space S3 as shown in FIG. 4. The inside surface 32a of flange 32, and the interior surface 33, both face toward the space S3. The belt retaining portion 3 retains a belt on an outer wall 31 thereof, and includes V-shaped grooves 311 which are spin formed in the outer wall 31 as shown in FIGS. 3a and 3b. In this case, a positioning die 53 for fixing the belt retaining portion 3 is inserted into the space S4.

A ring-shaped rubber or elastic member 4 of a uniform thickness is forced into the space between the inner surface 32a of flange 32 and the inner surface 21a of the flange 21.

When torsional vibrations are exerted from the rotary shaft, the belt retaining portion 3 resonates therewith, thereby absorbing or restraining the exerted torsional vibrations.

The boss portion 1 and the main portion 2 are formed by press-forming, and the annular space S3 having an U-shaped cross-section is formed between the surrounding wall of the boss portion 1, main portion 2, and the flange 21. The rubber or elastic member 4 is forced into the space along the inner surface 21a of flange 21.

As shown in FIG. 4, the belt retaining portion 3 is attached to the central portion 100 such that the opening S4 thereof is reversed in direction to opening S3. The inner wall or flange 32 of the belt retaining portion 3 is inserted into the space S3 and the interior surface 32a will contact the inner surface of the rubber or elastic member 4.

Figure 5:
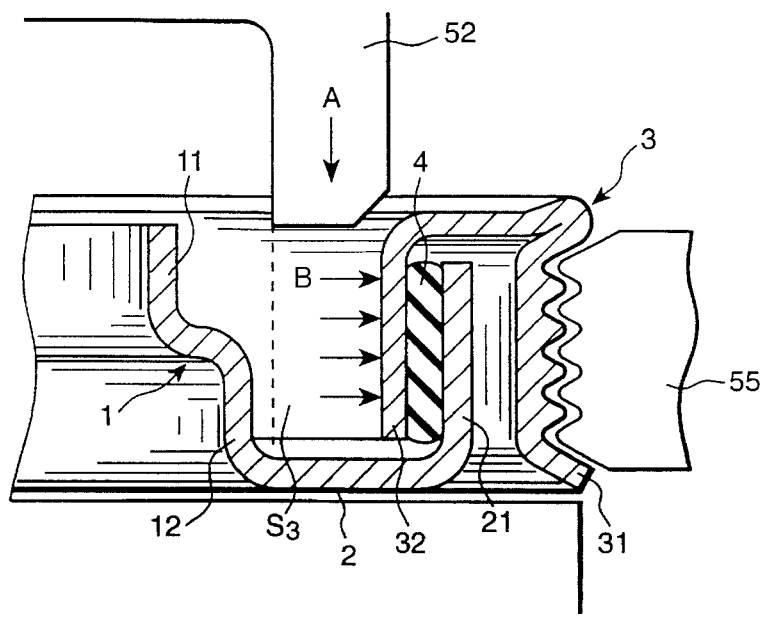
FIG. 5 is an enlarged partial cross-sectional view of a further step of manufacturing the present invention.

As shown by an arrow A in FIG. 5, a press punch 52 is inserted into the annular space S3 to push the inner wall 32a of flange 32 toward the outer wall 31, which force is resisted by placing a fixing or forming die 55 into contact with the grooved outer wall 31. By inserting the punch 52, the inner wall 32a is pushed toward the outer wall 31 as shown by arrows B so that the rubber or elastic member 4 is compressed between flanges 21 and 32. As a consequence, the rubber or elastic member 4 is positioned firmly between flange 32 and flange 21 without cure bonding.

Figure 6A:
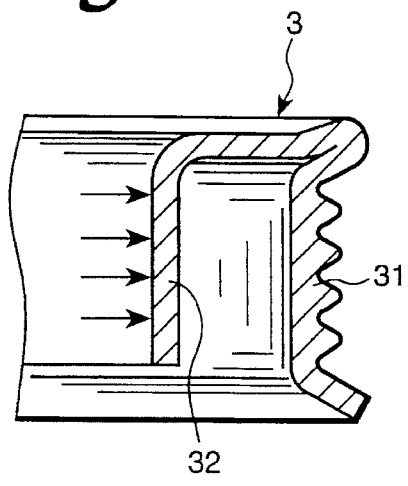
FIGS. 6a and 6b are enlarged partial cross-sectional views of the belt retaining portion in the manufacturing process in accordance with the present invention.
Figure 6B:
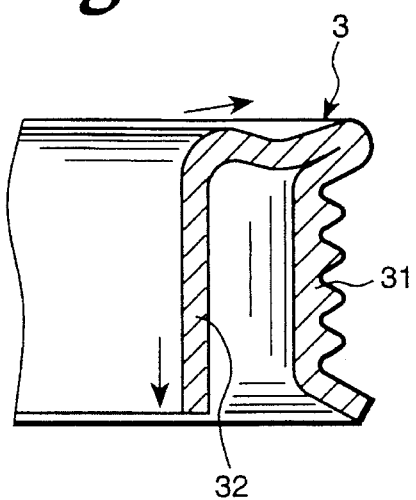
Figure 7:
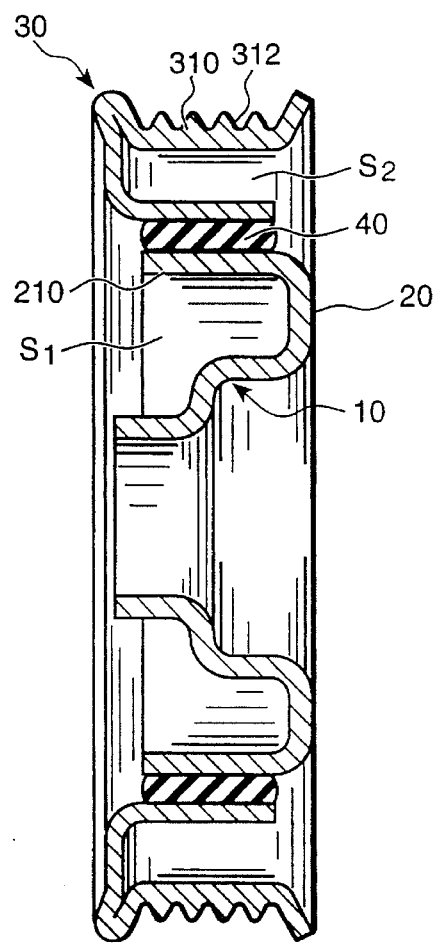
FIG. 7 is a cross-sectional view of a conventional damper pulley.

As shown by the arrows in FIGS. 6a and 6b, flange 32 is moved toward the outer wall 31 so that each part thereof can be deformed easily without occurring cracks.

Besides, as flange 32 is positioned adjacent the inside of the flange 21, when the outer diameter of the damper pulley is fully formed, the space between the flange 32 and the outer wall 31 can be sufficient for inserting a positioning die 53 so that it can be easily disposed there between.

The boss portion 1 and the main portion 2 are preferably integrally formed from a metal plate. However, they may also be formed of separate tubular metal member that are subsequently joined together by welding or other suitable technique.

As described above, the damper pulley, provided in accordance with the present invention, can be produced in a simple manner and the weight of the damper pulley can be significantly reduced, because, at least the main portion and the belt retaining portion are formed from a thin metal plate, and so that both portions do not need to be welded.

Besides, the inner flange of the belt retaining portion is placed in the annular space formed within the central portion so that the dimensions of the belt retaining portion are sufficient for inserting a positioning die to permit forming grooves in the outer wall.

Further, the rubber or elastic member is compressed by pushing the flange of the belt retaining portion toward the outer wall thereof so that each portion is deformed comparatively freely, and cracking is avoided.

While the invention has been described in connection with what is presently considered to be the most practical and preferred embodiment, it is to be understood that the invention is not to be limited to the disclosed embodiment, but on the contrary, is intended to cover various modification and equivalent arrangements included within the spirit and scope of the appended claims.

What is claimed is:

1. A damper pulley comprising:

a central portion including a cylindrical boss portion having an axis, arranged to be fixed onto a rotary shaft, a main portion extending radially outwardly from said boss portion and a central portion flange extending axially from an outer periphery of said main portion, said central portion defining an annular space having a substantially U-shaped cross-section in profile, a ring-shaped belt retaining portion made of metal plate having an outer wall, a wall portion radially extending from said outer wall, and a belt retaining flange extending axially from an outer periphery of said wall portion to produce a substantially U-shaped cross-section in profile in reverse to said space of the central portion, said belt retaining flange being positioned so that an inside surface lies adjoining an inside surface of said central flange, and a ring-shaped rubber or elastic member being positioned between said inner surface of said belt retaining flange and an inner surface of said central flange.

2. A damper pulley according to claim 1, wherein said boss portion and the main portion are integrally formed from metal plate.

3. A damper pulley according to claim 1, wherein said belt retaining portion includes belt retaining grooves in an outer peripheral surface thereof.

* * * * *